United States Patent
Posselius et al.

(10) Patent No.: US 10,045,489 B2
(45) Date of Patent: Aug. 14, 2018

(54) SYSTEM AND METHOD FOR DETERMINING KNIFE USAGE

(71) Applicant: CNH Industrial America LLC, New Holland, PA (US)

(72) Inventors: John Posselius, Ephrata, PA (US); Frederik Tallir, Esen (BE); Didier Verhaeghe, Ieper (BE)

(73) Assignee: CNH Industrial America LLC, New Holland, PA (US)

( * ) Notice: Subject to any disclaimer, the term of this patent is extended or adjusted under 35 U.S.C. 154(b) by 39 days.

(21) Appl. No.: 15/125,444

(22) PCT Filed: Mar. 12, 2015

(86) PCT No.: PCT/EP2015/055139
§ 371 (c)(1),
(2) Date: Sep. 12, 2016

(87) PCT Pub. No.: WO2015/136026
PCT Pub. Date: Sep. 17, 2015

(65) Prior Publication Data
US 2017/0094910 A1    Apr. 6, 2017

(30) Foreign Application Priority Data
Mar. 12, 2014    (BE) .................................. 2014/0158

(51) Int. Cl.
*A01F 29/01*    (2006.01)
*A01F 29/22*    (2006.01)
(Continued)

(52) U.S. Cl.
CPC .............. *A01F 29/22* (2013.01); *A01F 29/01* (2013.01); *A01F 29/06* (2013.01); *A01F 29/10* (2013.01)

(58) Field of Classification Search
CPC .......... A01F 29/22; A01F 29/01; A01F 29/06; A01F 29/10
(Continued)

(56) References Cited

U.S. PATENT DOCUMENTS 4,518,124 A    5/1985    Klinner et al.
6,296,566 B1 *  10/2001    Tanis ...................... A01F 12/10
                                                                        460/68
(Continued)

FOREIGN PATENT DOCUMENTS

DE    202004004133 U1    6/2004
DE    202009015118 U1    12/2010
(Continued)

OTHER PUBLICATIONS

Hansen et al., Cutter distance sensor for an adaptive position-/torque control in cross cutters, 2002, IEEE, p. 54-61.*
(Continued)

*Primary Examiner* — McDieunel Marc
(74) *Attorney, Agent, or Firm* — Peter K. Zacharias

(57) ABSTRACT

A system for determining knife usage. The system includes an infeed cutter including a cutter rotor, a knife drawer, and a plurality of knives extending through the knife drawer. The cutter rotor is mounted above the knife drawer such that a cutting zone for crop material is defined. The system further includes a measuring device configured to measure a quantity which is representative for the couple exerted by the cutter rotor on crop material going through the cutting zone of the infeed cutter, a controller configured to control the measuring device for measuring values for the quantity at consecutive moments in time, and a knife usage determining module configured to determine knife usage based on the measured values.

18 Claims, 5 Drawing Sheets

(51) Int. Cl.
*A01F 29/10* (2006.01)
*A01F 29/06* (2006.01)

(58) Field of Classification Search
USPC .......................................................... 701/50
See application file for complete search history.

(56) References Cited

U.S. PATENT DOCUMENTS

| | | | |
|---|---|---|---|
| 6,298,646 B1* | 10/2001 | Schrag | A01F 15/101 |
| | | | 100/88 |
| 6,679,042 B1* | 1/2004 | Schrag | A01F 15/10 |
| | | | 56/341 |
| 6,886,314 B2 | 5/2005 | Pirro et al. | |
| 6,931,828 B2 | 8/2005 | Kormann | |
| 7,024,924 B2 | 4/2006 | Heinrich et al. | |
| 7,370,461 B2 | 5/2008 | Silbernagel | |
| 8,905,343 B2 | 12/2014 | Gaudreault et al. | |
| 2009/0173051 A1 | 7/2009 | Aurora | |
| 2013/0167498 A1 | 7/2013 | Haycocks | |

FOREIGN PATENT DOCUMENTS

| | | |
|---|---|---|
| EP | 1614342 A1 | 1/2006 |
| EP | 2436258 A1 | 4/2012 |

OTHER PUBLICATIONS

Hansen et al., Close contact [cross cutters, knives], 2003, IEEE, p. 33-39.*
Peisong et al., Virtual design and kinematic simulation for cutter of corn harvester, 2008, IEEE, p. 313-317.*
Xia et al., Research of combinative altitude difference between advanced knife and scraper, 2011, IEEE, p. 2476-2479.*

* cited by examiner

SYSTEM AND METHOD FOR DETERMINING KNIFE USAGE

FIELD OF INVENTION

The field of the invention relates to the determining of properties of an infeed cutter, and in particular to a system and method for determining knife usage in an infeed cutter.

BACKGROUND

Cutting crop material such as straw or silage requires a large amount of power from the tractor, and the better the knife quality, the less fuel the tractor consumes. When the knives are not sharp anymore, the pressure, and hence the force on the knife raises, resulting in the knives sliding backwards and disappearing at least partially out of the crop flow into the knife drawer. This is made possible by spring loading each knife. By spring loading the knives, the infeed cutter is protected against solid foreign objects, avoiding that the knives break when foreign objects enter into the infeed cutter.

In prior art systems, if an operator wants to get in an indication of the knife sharpness, he needs to physically examine the knives. Such an examination is time consuming and requires the baler to be stopped.

SUMMARY

The object of embodiments of the invention is to provide a system and method allowing to obtain an indication of knife sharpness during operation of the baler.

According to a first aspect of the invention there is provided a system for determining knife usage in an infeed cutter. The system comprises the infeed cutter, a measuring device, a controller and a knife usage determining module. The infeed cutter comprises a cutter rotor and a knife drawer with a plurality of knives. The plurality of knives extends through the knife drawer, and the cutter rotor is mounted above the knife drawer such that a cutting zone for crop material is defined. The measuring device is configured to measure a quantity which is representative for the couple exerted by the rotor on the crop material going through the cutting zone of the infeed cutter. The controller is configured to control the measuring device for measuring values of said quantity at consecutive moments in time. The knife usage determining module is configured to determine knife usage based on the measured values.

Embodiments of the invention are based inter alia on the inventive insight that the load on the cutter rotor is a good measure for determining knife sharpness. Although the couple exerted by the rotor on the crop material typically varies during a loading cycle, because the pressure in the cutting zone increases as more material is collected and stored, the inventors realized that by measuring this value at consecutive moments in time during baling, those measurements can lead to an accurate determination of the knife sharpness. In addition, such a system has the advantage that a quantity which is representative for the couple can be easily measured at consecutive moments in time without interrupting the baling operation.

According to a preferred embodiment the system further comprises a pre-compression chamber for storing crop material that has passed through the cutting zone, and a stuffer adapted for moving the crop material to a bale chamber upon completion of a loading cycle of the pre-compression chamber. The controller may then be configured to control the measuring device for measuring a value of the quantity which is representative for the couple at a predetermined moment of the loading cycle, for consecutive loading cycles. The knife usage determining module may then be configured for determining knife usage based on the measured values for consecutive loading cycles. During a single loading cycle, the couple will increase as the pre-compression chamber gets fuller. However, if the knife sharpness would remain the same, the loading cycle will not vary provided that the other baling conditions remain the same. As the sharpness of the knives decreases, the couple will increase, and by selecting a predetermined moment of the loading cycle for measuring the couple, this measurement can be used as an indication of knife sharpness.

In a preferred embodiment, the moment at which the stuffer moves the crop material from the pre-compression chamber to the bale chamber, is used as a reference for determining the moment at which the quantity representative for the couple is measured. Preferably, this quantity is measured immediately after or shortly after the moment that the stuffer has moved the crop material from the pre-compression chamber to the bale chamber. Measuring immediately after of shortly after the stuffer has stripped, is advantageous because then the pre-compression chamber is empty or almost empty, and the load on the cutter rotor will be substantially equal to the load required to cut the crop material.

In a preferred embodiment, the knife usage determining module is configured for determining that the knives need to be replaced when the measured values are above a threshold. Preferably, there is provided a calibration module configured for determining the threshold based on baling conditions such as the type of crop material, the external conditions (humidity, temperature, etc.), the baling speed, etc. Typically, the calibration module will also use a measured value for the couple exerted by the cutter rotor on the crop material at the start of a baling operation, when the plurality of knives is sharp. In further developed embodiments, in order to obtain the required inputs for the calibration module, there may be provided temperature measurement means, humidity measurement means, an interface configured for allowing the user to enter the type of crop material, baling speed measurement means, etc.

In a preferred embodiment, the plurality of knives is spring mounted and extends through a plurality of slits in the knife drawer. The system further comprises a plurality of sensing modules adapted for sensing values for a quantity which is representative for the position of the plurality of knives, wherein each knife of the plurality of knives is associated with a sensing module of the plurality of sensing modules. The knife usage determining module is then further configured for determining knife usage based on the sensed values by the plurality of position sensing modules.

In a preferred embodiment, it may be determined that the knives need to be replaced when the position of a large number of the plurality of knives is too far backwards when baling with a normal baling speed.

According to a further developed embodiment there may be provided a speed acceptability determining module configured to determine if a baling speed is acceptable based on the sensed values by the plurality of position sensing modules. E.g. if the knives are new and it is determined that the position of a large number of knives is too far backward, an indication may be given by the speed acceptability determination module to lower the baling speed. Also, the knife usage determining module may take into account the baling speed. More in particular, the baling speed may be used to determine the above specified threshold.

According to yet another embodiment, the plurality of knives is spring mounted, and there is provided at least one pressure sensing module adapted for sensing values for a quantity which is representative for the pressure exerted by the plurality of spring mounted knives on crop material going through the infeed cutter. There may be provided a single pressure sensing module for sensing the total pressure exerted on the plurality of knives, and/or a plurality of pressure sensing modules for sensing the individual pressure exerted on each knife. The knife usage determining module may then be configured for determining knife usage further based on the sensed values by the at least one pressure sensing module. E.g. if the pressure on each individual knife is above a certain threshold pressure, it may be determined that the knives need to be replaced.

Accord to another aspect of the invention, there is provided a method for determining knife usage in an infeed cutter comprising a cutter rotor and knife drawer with a plurality of knives extending through the knife drawer, wherein the cutter rotor is mounted above the knife drawer such that a cutting zone for crop material is defined. The method comprises measuring values for a quantity which is representative for the couple exerted by the cutter rotor on crop material going through the cutting zone of the infeed cutter, at consecutive moments in time; and determining knife usage based on said measured values.

In a preferred embodiment, the measuring comprises measuring a value for the quantity at a determined moment of the loading cycle, for consecutive loading cycles, wherein each loading cycle ends with a stuffer moving the crop material from a pre-compression chamber located after the cutting zone, to a bale chamber. The determining may then comprise determining knife usage based on the measured values for the consecutive loading cycles. More in particular, the measuring may comprise measuring a value for said quantity shortly after the stuffer has moved the crop material from the pre-compression chamber to the bale chamber.

In an embodiment the determining comprises determining that the knives need to be replaced when the measured values are above a threshold. The method may then further comprise determining the threshold based on a measured value for the couple at the start of a baling operation, preferably when the plurality of knives are used for the first time; and/or based on the baling speed; and/or based on the type of crop material; and/or based on external baling conditions.

In a preferred embodiment, the plurality of knives is spring mounted, and the method further comprises sensing values for a quantity which is representative for the position of each knife of the plurality of knives. The determining of knife usage may then be further based on the sensed values for the position. Using both the measured values for the quantity which is representative for the couple exerted by the cutter rotor, as well as the sensed values for a quantity which is representative for the position, it can be accurately determined when the knives need to be replaced.

In a possible embodiment, the sensed values for a quantity which is representative for the position of each knife of the plurality of knives may be further used to determine if the baling speed is acceptable.

According to yet another aspect of the invention there is provided a computer device or other hardware device programmed to perform one or more steps of any one of the embodiments of the method disclosed above. According to another aspect there is provided a data storage device encoding a program in machine-readable and machine-executable form to perform one or more steps of any one of the embodiments of the method disclosed above.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF EMBODIMENTS

Figure 1:
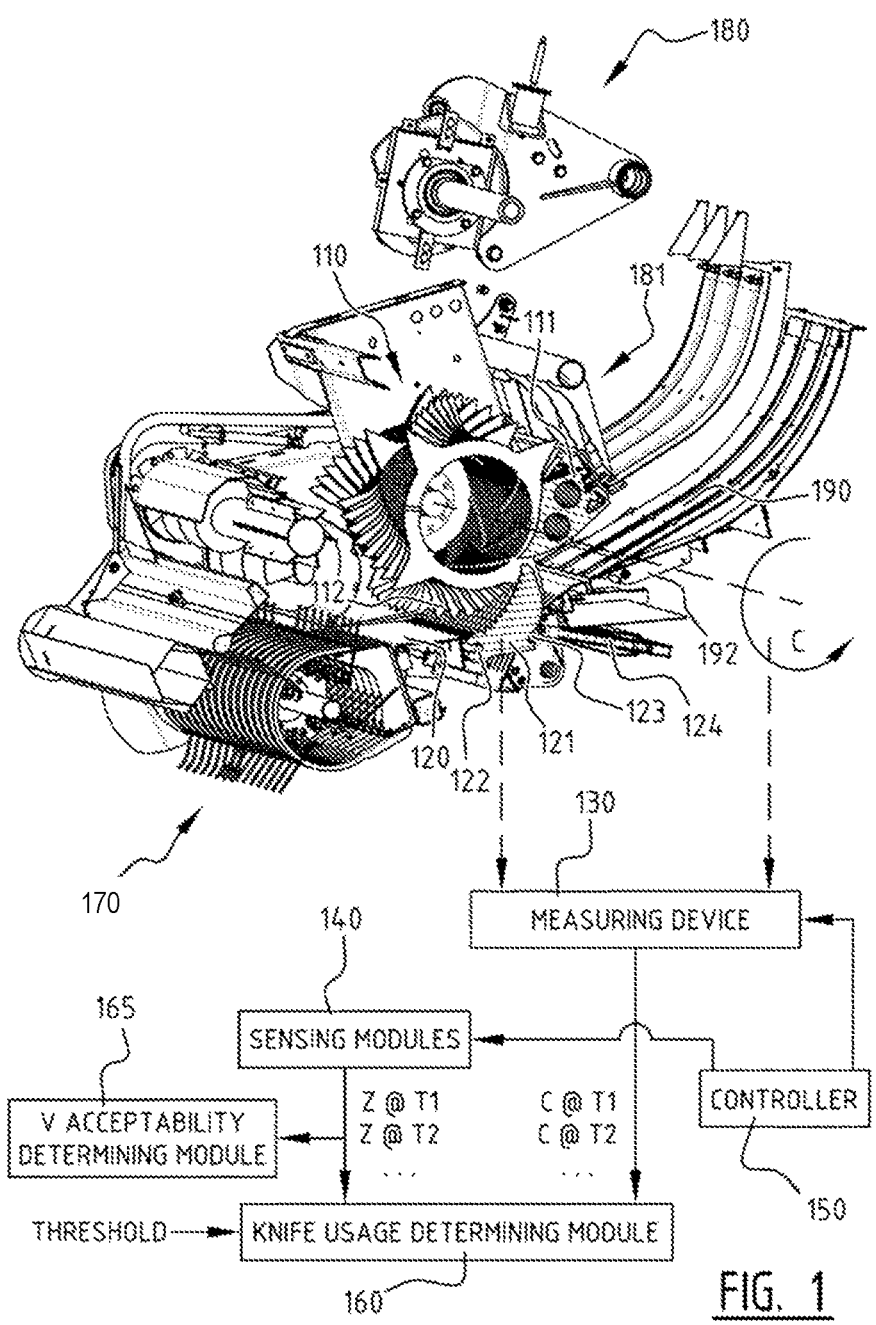
FIGS. 1 and 1A illustrate perspective views of an embodiment of an infeed cutter in combination with a schematic view of an embodiment of the system of the invention.

FIG. 1 illustrates a first embodiment of a system of the invention. On balers the crop material is picked-up by a pick-up 170, and the picked-up crop material is forced by a cutter rotor 110 against a plurality of knives 121 which extend through a knife drawer 120 which forms a part of the bottom of the pre-compression chamber 190.

Each knife 121 is individually spring loaded by means of an overload spring 124. To that end each knife 121 is mounted pivotally around an axis 122 and the overload spring 124 acts on a break-away linkage fixedly connected to an axis part 123. When the pressure on a knife 121 exceeds a determined threshold, the axis part 123, and hence the break-away linkage, is pushed backwards, compressing the overload spring 124. Any overloading or overfeeding or the presence of a foreign object will cause the affected knife 121 to break away against the force of the spring 124, and when the obstruction has passed, the knife 121 can return to its original cutting position.

Figure 1A:
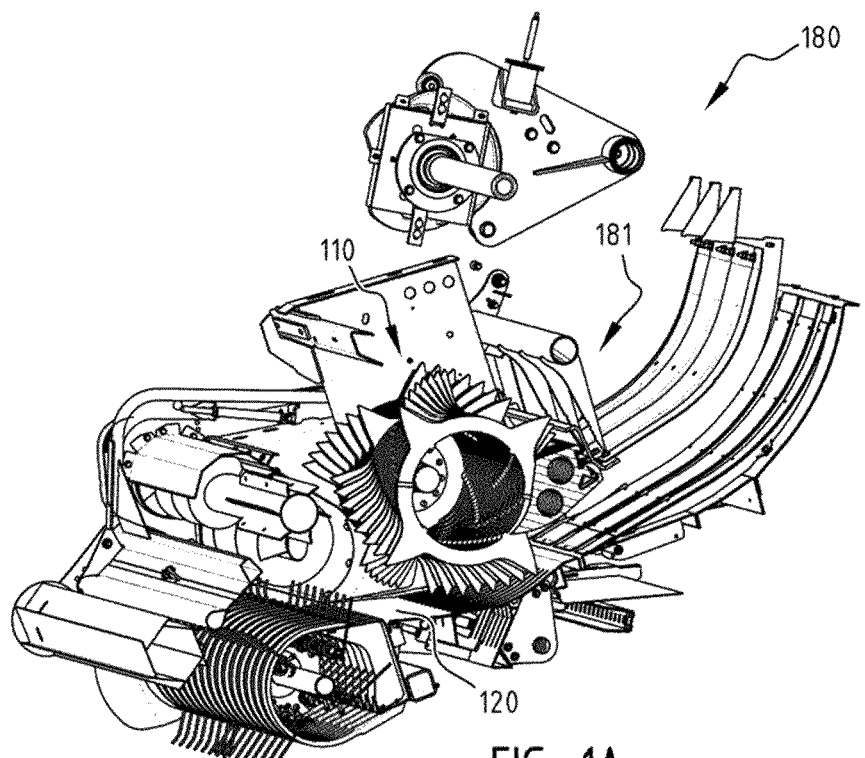

The cutter rotor 110 is cleaned by scrapers 111 and pushes the crop material in the pre-compression chamber 190. When sufficient crop material has been fed, the pressure from the crop material activates sensor plates 192 located in the bottom of the pre-compression chamber 190, which in turn puts the stuffer mechanism 180 in operation, causing the stuffer fingers 181 to sweep the calibrated charge of crop material into the bale chamber, as can be best seen in FIG. 2. In FIGS. 1 and 1A parts of the stuffer mechanism have been omitted for clarity purposes. In that way a consistent bale density may be achieved flake after flake. Typically between 40 and 50 loading cycles per minute can be reached, i.e. between 40 and 50 flakes per minute move to the bale chamber.

Figure 3:
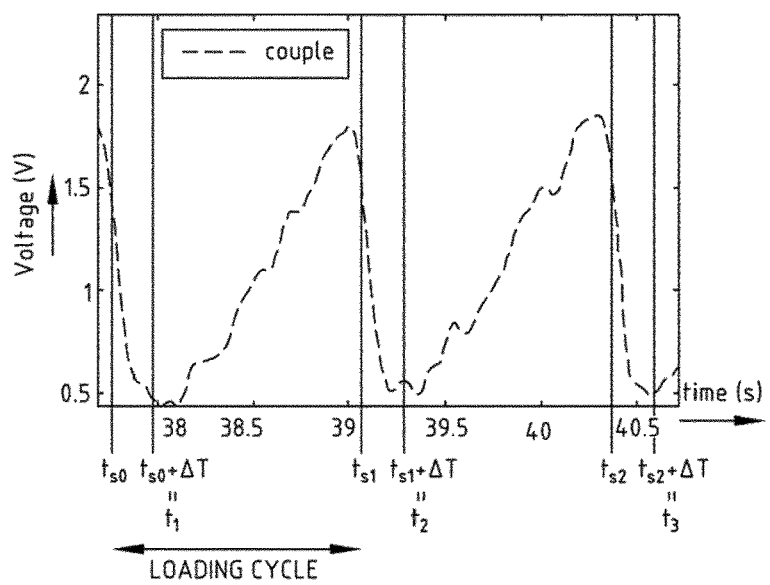
FIG. 3 is a graph illustrating a quantity representative for the couple exerted by the cutter rotor in function of the time.

The embodiment of the system of FIG. 1 for determining knife usage comprises an infeed cutter with the cutter rotor 110 and the knife drawer 120 with the plurality of knives 121 extending through said knife drawer; a measuring device 130; a plurality of sensing modules 140; and a knife usage determining module 160. The measuring device 130 is configured to measure a quantity which is representative for the couple exerted by the rotor on crop materials going through the infeed cutter. The measuring device may measure e.g. the power that is consumed to rotate the cutter rotor. FIG. 3 plots the voltage of a rotor couple sensor as a measure for the power, and hence for the couple, in function of the time. The vertical lines in the graph at ts0 and at ts0+$\Delta$T indicate the beginning and the end of a stuffer sweep period at the end of a loading cycle of the pre-compression chamber 190. The next sweeps take place between ts1 and ts1+$\Delta$T, and between ts2 and ts2+$\Delta$T. The controller 150 is configured to control the measuring device 130 for measuring values of said voltage at consecutive moments in time, e.g. at each beginning of a loading cycle, i.e. at t0=ts0+$\Delta$T, t1=ts1+$\Delta$T, and at t2=ts2+$\Delta$T. This is a good time to perform the measurement since at that time the stuffer has just tripped and the pre-compression chamber is empty, which implies that the load is substantially equal to the load to cut the crop material. It is also possible to perform a measurement at different moments in time during the same loading cycle, and to use an average value for each loading cycle. Yet another possibility would be to measure the voltage at the end of a loading cycle, i.e. at t0=ts0, t1=ts1, and at t2=ts2. The skilled person understand that many variants are possible within the scope of the present invention.

Figure 6:
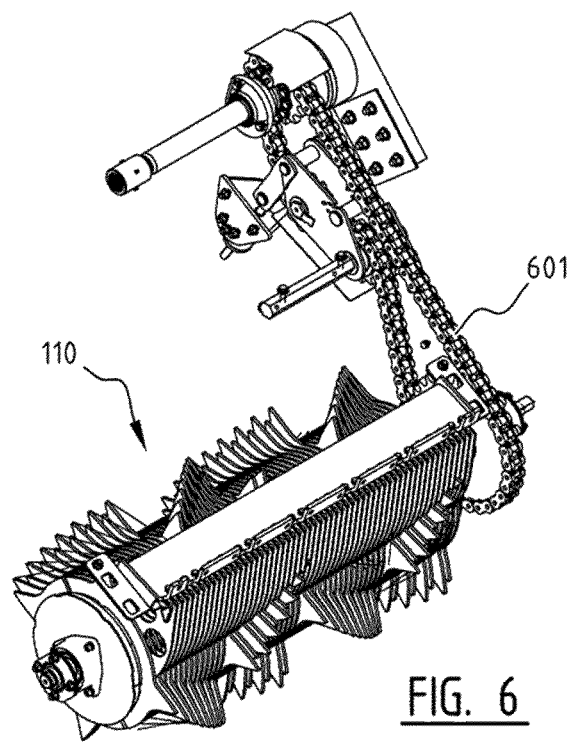
FIG. 6 illustrates a schematic perspective view of a cutter rotor and the driving means thereof

According to a possible embodiment, the measuring device for measuring the couple comprises a number of strain gauges arranged on a shaft part, e.g. a shaft part coming out of the main gear box. These strain gauges measure the torsional load on the shaft, and hence a measure for the couple exerted by the rotor on the crop material. FIG. 6 shows the cutter rotor 110 which is driven by a chain 601. The shaft coming out of the main gear box (not illustrated) can be provided with strain gauges which measure the torsion, and hence the couple present in the drive shaft. The measurements by the (rotating) strain gauges can be transferred to the knife usage determining module 160 by a slip ring mechanism.

The knife usage determining module 160 is configured to determine knife usage based on the measured values. The knife usage determining module 160 could be configured to use e.g. a value representative for the couple for each loading cycle, starting when the knives are new. If it is assumed that the conditions, such as the driving speed of the baler, the type of crop material, the humidity, etc remain the same, then the knife usage determining module 160 may be configured to provide a message that the knives need to be changed when the measured voltage is e.g. 20% higher than the voltage value measured at the beginning when the knives were new. More generally the knife usage determining module may be configured for determining that the knives need to be replaced when the measured values are above a threshold, wherein this threshold may be dependent on a number of conditions such as the type of crop material, the baling speed, the temperature, the humidity, etc. This threshold could be determined at the start of a baling operation, preferably when the plurality of knives are used for the first time.

In the embodiment of FIG. 1 the system further comprises a plurality of position sensing modules 140 adapted for sensing values for a quantity which is representative for the position of the plurality of knives 121. Each knife 121 has its own a sensing module 140 which is capable of determining to which extent z the knife extends through the knife drawer 120. This could be a standard robust sensing module which is mounted in an opening of the knife drawer 120, and is capable of "looking" at the associated knife 121.

Figure 2:
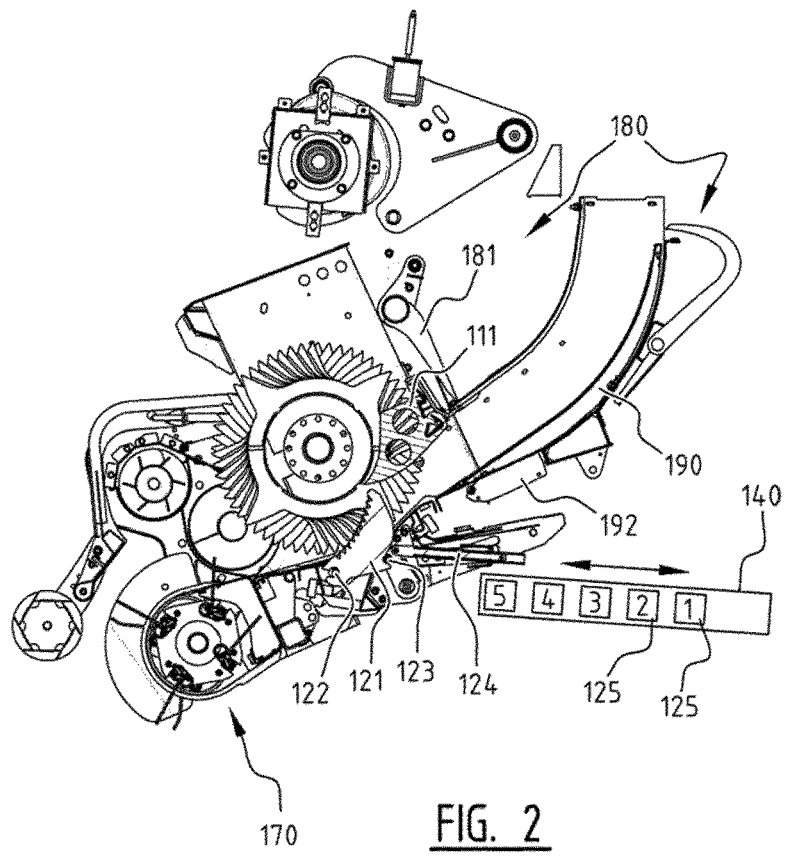
FIG. 2 is a side view of the perspective view of FIG. 1.

In an exemplary embodiment which is illustrated in FIG. 2 the sensing module 140 may comprise multiple sensors 125 for determining the position of the knife 121. In the exemplary embodiment five inductive sensors 125 are provided and each sensor 125 is activated separately if the knife 121 is in certain position. This is achieved by detecting the position of the rod of the overload spring 124. A sensor 125 may give e.g. a high output if metal is in front of sensor. The determination of the position could be e.g. as follows:

high output at sensor 1=knife completely out
high output at sensor 2=knife 25% in crop flow
high output at sensor 3=knife 50% in crop flow
high output at sensor 4=knife 75% in crop flow
high output at sensor 5=knife 100% in crop flow The rod of the overload spring 124 moves back and forward. If the rod is only in front of sensor 5 (the sensor closest to the rod) it is determined that the knife is 100% in the crop flow. If the rod is in front of sensor 5 and 4, it is determined that the knife is 75% in the crop flow. If the rod is in front of sensor 5, 4, and 3, it is determined that the knife is 50% in the crop flow. If the rod is in front of sensor 5, 4, 3, and 2, it is determined that the knife is 25% in the crop flow. If the rod is in front of sensor 5, 4, 3, 2, and 1 it is determined that the knife is completely out of the crop flow.

Figure 5:
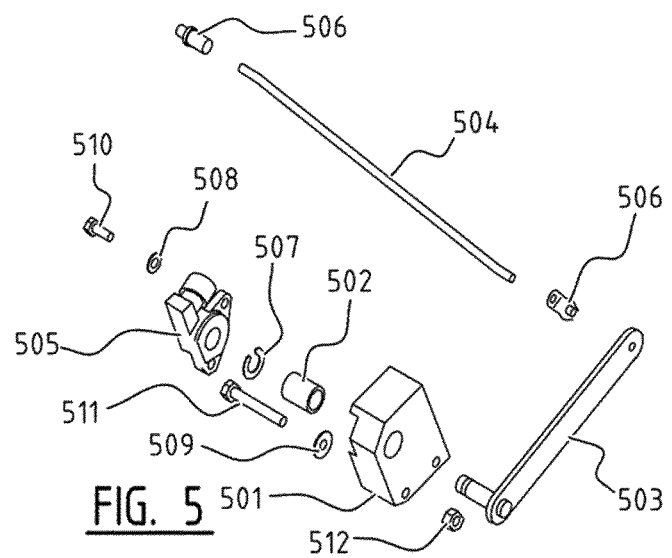
FIG. 5 is a schematic perspective view of an embodiment of a sensing module.

FIG. 5 illustrates another possible embodiment of the sensing module 140 using mechanical means. Mounting piece 501 is intended for being fixed on the knife drawer frame using connecting means 509, 512, 511. A sensor 505 is mounted on mounting piece 501 via connecting means 510, 508, and is standing still. Pivot arm 503 is a pivotable arm that is connected to the sensor 505, through mounting piece 501 via intermediate elements 502, 507. A first end of a connection rod 504 is connected to pivot arm 503 and a second end of the connection rod 504 may be connected either to the knife 121 itself or to the rod of the overload spring 124, via connections means 506.

The latter will sometimes be preferred because this will avoid that the sensor has to be disconnected when replacing a knife 121.

The knife usage determining module 160 may then be further configured for determining knife usage based on the sensed values (z at t1, z at t2, z at t3, etc, for each knife) by the plurality of position sensing modules 140. In the exemplary embodiment illustrated above, z could take e.g. values corresponding with "knife completely out", "knife 25% in crop flow", "knife 50% in crop flow", "knife 75% in crop flow", "knife 100% in crop flow". In a typical embodiment the sensing modules may be sensing the extent z continuously during baling. When the knives 121 are no longer sharp the pressure exerted by the crop material on the knives 121 increases, and the knives 121 will be pushed inward reducing the extent z to which the knives extend out of the knife drawer 120. So the position of the knives 121 may be used as an additional indication of blunt knives. If only one or a couple of knives are pushed inward, this may be an indication that there is an obstruction, e.g. a foreign object in the pre-compression chamber.

The system of FIG. 1 may further comprise a speed acceptability determining module 165 configured to determine if a baling speed is acceptable based on the sensed values by the plurality of position sensing modules 140. Although not illustrated every baler typically has a speed measurement module for determining the baling speed, i.e. the driving speed of the baler which is also the speed at which the infeed cutter is moved in the field. The knife usage determining module 160 may be configured for determining knife usage further based on the baling speed. For a high baling speed the above described threshold for determining when the knives need to be replaced, will be higher than for a lower baling speed.

In FIG. 1 the springs 124 are mechanical springs, but the skilled person understands that they may be replaced with or supplemented by hydraulic cylinders. In addition, monitoring the pressure in the cylinders, the pressure exerted by the crop material on the associated knife 121 may be determined Such a system may be used in addition to or instead of the position sensing modules 140. The knife usage determining module 160 may then be further configured for determining knife usage based on the monitored pressure values in the cylinders.

The first embodiment of FIGS. 1, 1A and 2 provides a very convenient and efficient system which can indicate to a driver when the knives need to be replaced. In that way the knives can be replaced in time, avoiding high power consumption, and reducing fuel consumption of the baler.

Figure 1B:
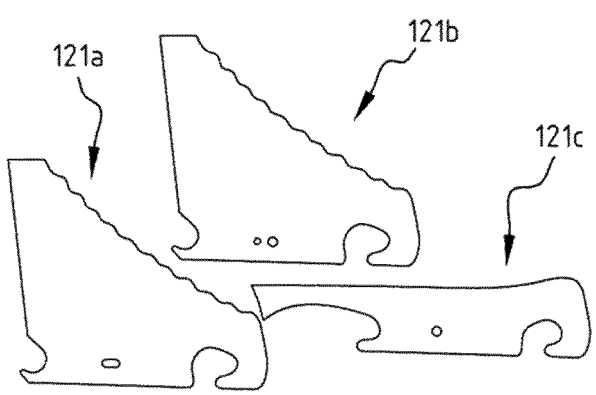
FIG. 1B illustrates different knife types as well as a dummy knife, which may be used in embodiments of the invention.

FIG. 1B illustrates a number of different knives that may be used in a system of the invention. Knife 121a is a standard knife, knife 121b is a straw knife and knife 121c is a dummy knife. Depending on the type of knives (standard or straw) and the number of dummy knives that is being used, the value used for the above mentioned threshold will be different.

Figure 4:
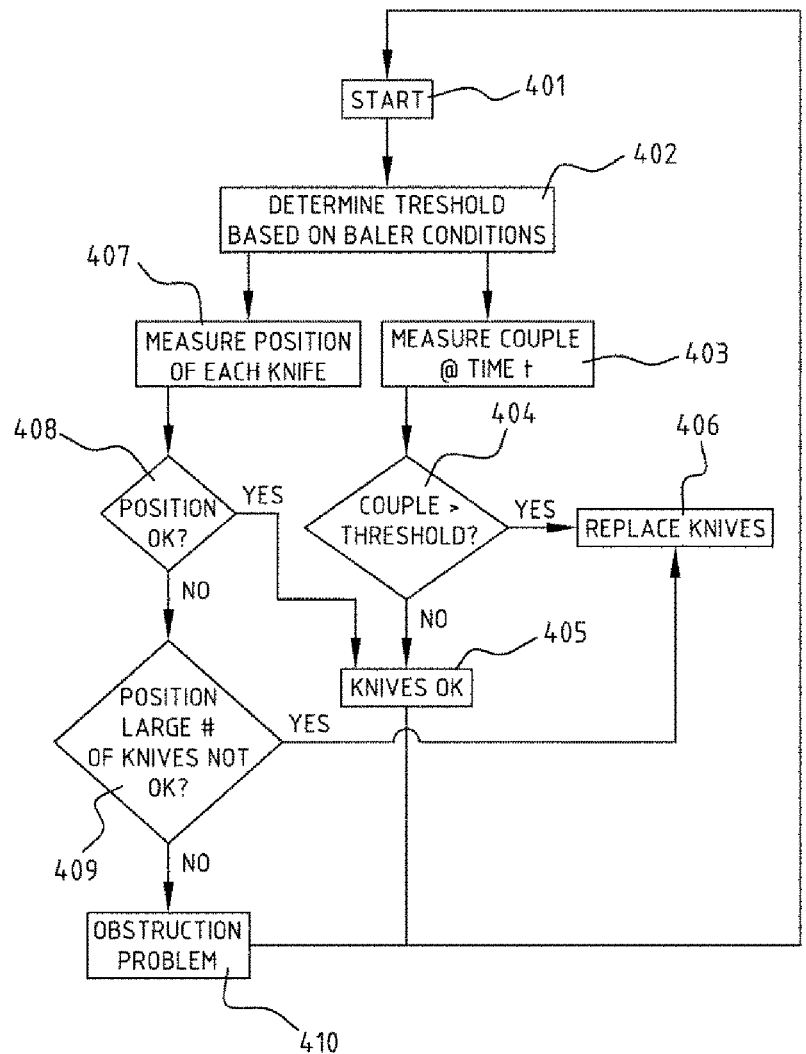
FIG. 4 is a flowchart illustrating an embodiment of a method of the invention.

FIG. 4 illustrates an embodiment of the method of the invention. The method is started in step 401. In step 402, a value is determined for a threshold which will be used to determine if the knives need to be replaced. The threshold may be a threshold value for the rotor couple, and may be determined based on baler conditions such as the type of crop material, the baling speed, the external conditions, etc. In step 403, the couple exerted by the cutter rotor is measured. In step 404, it is determined whether the measured couple is higher than the threshold. If that is not the case, it is determined in step 405 that the knives are OK. If, on the contrary, the measured couple is larger than the determined threshold, then it is determined in step 406 that the knives need to be replaced. Parallel to the measurements of the couple in step 403, there may be performed measurements of the position of each knife in step 407. If it is determined in step 408 that the position of each knife is OK, then it is determined in step 405 that the knives are OK. If, on the contrary, it is determined that the position of at least a number of knives is not OK, then the algorithm proceeds with step 409. In step 409, it is determined whether the position of a large number of knives is not OK. If only a small number of knives is not OK, it is determined in step 410 that there is an obstruction problem, meaning that there may be e.g. a foreign object in the cutting zone. If, on the contrary, the position of a large number of knives is not OK, it is determined in step 406 that the knives need to be replaced.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the figures, including any functional blocks labelled as "modules" or "controllers", may be provided through the use of dedicated hardware as well as hardware capable of executing software. When provided by a controller, the functions may be provided by a single dedicated controller, by a single shared controller, or by a plurality of individual controllers, some of which may be shared. Moreover, explicit use of the term "module" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow diagrams, and the like represent various methods which may be substantially represented in computer readable medium.

Whilst the principles of the invention have been set out above in connection with specific embodiments, it is to be understood that this description is merely made by way of example and not as a limitation of the scope of protection which is determined by the appended claims.

The invention claimed is:

1. A system for determining knife usage, the system comprising:
   an infeed cutter comprising a cutter rotor, a knife drawer, and a plurality of knives extending through the knife drawer, the cutter rotor mounted above the knife drawer such that a cutting zone for crop material is defined;
   a measuring device configured to measure a quantity which is representative for the couple exerted by the cutter rotor on the crop material going through the cutting zone of the infeed cutter;
   a controller configured to control the measuring device for measuring values for the quantity at consecutive moments in time; and
   a knife usage determining module configured to determine knife usage based on the measured values.

2. The system of claim 1, further comprising a pre-compression chamber for storing crop material that has passed through the cutting zone, and a stuffer adapted for moving the crop material to a bale chamber upon completion of a loading cycle of the pre-compression chamber,
   wherein the controller is configured to control the measuring device for measuring a value for the quantity at a determined moment of the loading cycle, for each of consecutive loading cycles, and
   wherein the knife usage determining module is configured for determining knife usage based on the measured value for each of the consecutive loading cycles.

3. The system of claim 2, wherein the controller is configured to control the measuring device for measuring a value for the quantity after a predetermined time has passed counted from the moment that the stuffer starts moving the crop material from the pre-compression chamber to the bale chamber, the predetermined time being preferably at least five times smaller than the duration of a loading cycle.

4. The system of claim 1, wherein the knife usage determining module is further configured for determining that the knives need to be replaced when the measured values are above a threshold.

5. The system of claim 4, further comprising a calibration module configured for determining the threshold based on baling conditions and a measured value for the couple exerted by the cutter rotor on the crop material, at the start of a baling operation, when the plurality of knives are used for the first time.

6. The system of claim 1, wherein the knife drawer comprises a plurality of slits, and wherein the plurality of knives are spring-mounted and extend through the plurality of slits in the knife drawer, the system further comprising:
a plurality of position sensing modules adapted for sensing values for a quantity which is representative for the positions of the plurality of knives, each knife of the plurality of knives being associated with a respective one of the plurality of sensing modules,
wherein the knife usage determining module is configured for determining the knife usage further based on the sensed values by the plurality of position sensing modules.

7. The system of claim 6, further comprising a speed acceptability determining module configured to determine if a baling speed is acceptable based on the sensed values by the plurality of position sensing modules.

8. The system of claim 7, further comprising a speed measurement module for determining the baling speed being the speed at which the infeed cutter is moved in a field, wherein the knife usage determining module is configured for determining the knife usage further based on the baling speed.

9. The system of claim 4, wherein the threshold is based on the baling speed.

10. The system of claim 1, wherein the plurality of knives are spring-mounted, the system further comprising:
at least one pressure sensing module adapted for sensing values for a quantity which is representative of the pressure exerted by the plurality of spring mounted knives on crop material going through the infeed cutter, wherein the knife usage determining module is configured for determining the knife usage further based on the sensed values by the at least one pressure sensing module.

11. A method for determining knife usage in an infeed cutter comprising a cutter rotor, a knife drawer, and a plurality of knives extending through the knife drawer; the cutter rotor being mounted above the knife drawer, such that a cutting zone for crop material is defined; the method comprising:
measuring values for a quantity which is representative for the couple exerted by the cutter rotor on crop material going through the cutting zone of the infeed cutter, at consecutive moments in time; and
determining knife usage based on the measured values.

12. The method of claim 11, wherein the measuring comprises measuring a value for the quantity at a determined moment of the loading cycle, for each of consecutive loading cycles, each loading cycle ending with a stuffer moving the crop material from a pre-compression chamber located after the cutting zone to a bale chamber,
wherein the determining comprises determining knife usage based on the measured values for each of the consecutive loading cycles.

13. The method of claim 12, wherein the measuring comprises measuring a value for the quantity shortly after the stuffer has moved the crop material from the pre-compression chamber to the bale chamber.

14. The method of claim 11, wherein the determining comprises determining that the knives need to be replaced when the measured values are above a threshold.

15. The method of claim 14, further comprising determining the threshold based on a measured value for the couple at a start of a baling operation.

16. The method of claim 11, wherein the plurality of knives are spring-mounted, the method further comprising:
sensing values for a quantity which is representative of the position of each knife of the plurality of knives,
wherein the determining of the knife usage further is based on the sensed values.

17. The method of claim 16, further comprising determining if a baling speed is acceptable based on the sensed values.

18. A digital data storage medium encoding a machine-executable program of instructions to perform the determining step of the method of claim 11.

* * * * *